Patented Dec. 3, 1940

2,223,789

UNITED STATES PATENT OFFICE 2,223,789

PROCESS FOR SEALING WATER BEARING STRATA

Hijman Limburg, Amsterdam, Netherlands, assignor to Shell Development Company, San Francisco, Calif., a corporation of Delaware No Drawing. Application January 3, 1939, Serial No. 249,165. In the Netherlands January 22, 1938

11 Claims. (Cl. 61—36)

The invention concerns a process for improving the cohesion of and for impermeabilizing and consolidating earthy or other masses containing water, as for example—subsoil sand or gravel layers, porous and water-bearing soils, seeping dikes, tunnels or cellar walls, foundations, river beds or shifting sands.

It is already known for the said purposes to treat the ground or other mass with impregnating agents of various kinds, such as aqueous bitumen dispersions, cement or clay suspensions and precipitate-forming chemicals.

In the present case the invention consists in introducing into the pervious water-bearing mass, a solution of asphalt bitumen in an organic solvent, or a mixture of organic solvents, which is miscible with water at the temperatures of the strata to be impermeabilized. In the presence of water such solutions precipitate out asphalt bitumen, which is deposited in the pores and openings of the water-bearing strata and effectively shuts off the water flow.

The composition of the asphalt bitumen solution to be applied, e. g., the concentration of the asphalt bitumen in the solvent, is determined by the nature of the water-bearing strata to be treated, as for example by the size of the interstices and the water-retentive capacity of these strata. For example, if a stratum with small pores is encountered, a more fluid asphalt bitumen solution should be used to penetrate such crevasses than in the case of a stratum having large openings. If the pervious stratum is of a highly water-retentive character, a solution requiring a relatively large quantity of water to bring about separation of the asphalt bitumen should be utilized. If, on the other hand, the mass to be treated is only slightly water-rententive, it is advantageous to previously enhance the water-rententive character of the mass by introduction of a solution of a wetting agent.

This invention is particularly useful in the treatment of oil-wells wherein the condition often occurs that several water-bearing strata may be encountered at different depths with intrajacent oil-bearing strata. In the use of previously known methods in such case it is necessary to determine the depths at which the various water-bearing strata occur and introduce the impermeabilizing agent at these points. In the practice of the present invention this procedure is not necessary as the sealing action, e. g., the precipitation of asphalt bitumen from the solution, will occur only in the presence of water. There is no danger of inadvertently sealing an oil-bearing stratum as the solution is soluble in oil. In using the present method only the water-bearing strata are sealed, the supply of oil to the borehole not being disturbed, so that substantially water-free oil is obtained.

In certain instances it is advantageous to add substances to the asphalt bitumen to modify its consistency, such as fillers (clay, lime, ground basic slag and the like) or soaps of heavy metals (calcium oleate, calcium sulphonate, iron naphthenate and the like). The penetration of the asphalt bitumen solution into the capillaries of the formation to be sealed may be further enhanced by adding to the asphalt solution capillary-active substances, such as alkali soaps, sulphonates, naphthenates or the like. Such substances may also serve to affect the form in which the primary separation of the asphalt bitumen takes place, namely as an emulsion or a coherent phase.

As solvents in preparing the asphalt bitumen solutions I use, preferably, organic solvents for asphalt of aromatic character that are water-soluble at the temperature prevailing in the strata to be treated. Examples are: pyridine, picoline, cinnoline, quinazoline, quinoxaline, amino pyridine, etc., their mixtures with each other and with partially water-soluble solvents such as the cresols, which mixtures are water-soluble. For example I have used a 50–50 mixture of pyridine and cresol with good results. The diamines, pyrrolidine and other water-soluble non-aromatic nitrogen-base compounds are useful for this purpose, as are alcohol blends of the above mentioned solvents. Aldehydes, as for example furfural, may also be satisfactorily used. In fact, organic asphalt solvents in general that will precipitate asphalt in the presence of water will serve the purpose of the invention.

The asphalt bitumen should be the hardest that may be conveniently used. It is desirable but not essential that the asphalt have a ring and ball melting point approximately 100° C. above that of the strata to be treated.

The following example will serve to illustrate the process of the invention.

Example

An asphalt bitumen having a ring and ball softening point of 130° C. and a penetration of 4 at 25° C. was dissolved in commercial pyridine until a 50:50 pyridine:asphalt solution was obtained. This solution was injected into a well producing oil from an oil sand at a depth of 6,500 feet below surface-level and adjoining directly at the top of the sand to a water-bearing stratum, resulting in a complete sealing of the water-bearing stratum. An analogous test in which a cresol-pyridine mixture of equal parts was substituted for the pyridine in the cited example gave equivalent results.

The process according to the invention may be applied by introducing a sufficient quantity of the bituminous solution into the water-bearing formation at the point of seepage to bring about an effective water shut-off. It is also possible to seal porous masses at a relatively great distance from the point of seepage by boring one or several shafts down to the water-bearing strata and introducing the bituminous solutions into these shafts by means of injection pipes. In those cases where a relatively high temperature prevails in the stratum to be treated, necessitating the use of a high melting bitumen, a more complete lixiviation of the solvent by the water may be obtained in this manner: The bitumen solution is introduced in the usual way at the point of seepage and pressure means supplied to force it into the formation to be treated. A shaft or shafts are drilled and so placed that water pressure may be applied in such manner as to force the bitumen solution back in the reverse direction. By alternate application of pressure, e. g., by forcing the bitumen solution into the water-bearing formations, then forcing it back in the reverse direction with water, then forcing it into the formation again in the original direction and repeating this process several times, a very complete water shut-off will result even under the most unfavorable conditions.

If desired, the above process may also be used to plug porous formations not containing water, such, for example, as gas-bearing layers, in this case, the injection of the treating bitumen solution is preceded or followed by the injection of a charge of water or brine sufficient to bring about the desired precipitation of the asphalt bitumen from the solution.

I claim as my invention:

1. A process for impermeabilizing or solidifying water-bearing strata comprising introducing therein a solution of asphalt bitumen in an organic water-miscible solvent, said solution being fluid and adapted to precipitate asphalt as an insolute when diluted with water.

2. The process of claim 1 wherein the solution used comprises asphalt bitumen and an organic water-soluble nitrogen base compound.

3. The process of claim 1 wherein the solution used comprises asphalt bitumen and an organic water-soluble solvent therefor of aromatic character.

4. The process of claim 1 wherein the solution comprises asphalt bitumen and pyridine.

5. The process of claim 1 wherein the solution comprises asphalt bitumen and a solvent therefor composed of pyridine and cresol.

6. The method of treating oil wells which penetrate oil and water formations for stopping water inflow to the well without hindering oil flow, comprising introducing therein a solution of asphalt bitumen in an organic water-miscible solvent, said solution being fluid and adapted to precipitate asphalt as an insolute when diluted with water.

7. A process for impermeabilizing or solidifying water-bearing strata comprising first treating the strata with an alkali soap and then introducing therein a solution of asphalt bitumen in an organic water-miscible solvent, said solution being fluid and adapted to precipitate asphalt as an insolute when diluted with water.

8. A process for impermeabilizing or solidifying water-bearing strata comprising first treating the strata with an alkali sulphonate, then introducing therein a solution of asphalt bitumen in an organic water-miscible solvent, said solution being fluid and adapted to precipitate asphalt as an insolute when diluted with water.

9. A process for impermeabilizing or solidifying water-bearing strata comprising first treating the strata with an alkali naphthenate, and then introducing therein a solution of asphalt bitumen in an organic water-miscible solvent, said solution being fluid and adapted to precipitate asphalt as an insolute when diluted with water.

10. A process for impermeabilizing or solidifying water-bearing strata, comprising introducing therein an asphalt bitumen having a ring and ball melting point approximately 100° C. above the prevailing temperature of the strata to be treated in solution with an organic water-miscible solvent, said solution being fluid and adapted to precipitate asphalt as an insolute when diluted with water.

11. A process for impermeabilizing or solidifying water-bearing strata comprising introducing therein a solution of asphalt bitumen in an organic water-miscible solvent, said solution being alternately forced in and out of said water-bearing strata and said solution being fluid and adapted to precipitate asphalt as an insolute when diluted with water.

HIJMAN LIMBURG.